(12) United States Patent
Lee

(10) Patent No.: US 9,083,040 B2
(45) Date of Patent: Jul. 14, 2015

(54) RECHARGEABLE BATTERY PACK

(71) Applicant: Samsung SDI Co., Ltd., Yongin, Gyeonggi-do (KR)

(72) Inventor: Kye-Youn Lee, Yongin (KR)

(73) Assignee: Samsung SDI Co., Ltd., Yongin-si (KR)

( * ) Notice: Subject to any disclaimer, the term of this patent is extended or adjusted under 35 U.S.C. 154(b) by 63 days.

(21) Appl. No.: 13/786,053

(22) Filed: Mar. 5, 2013

(65) Prior Publication Data

US 2013/0266823 A1    Oct. 10, 2013

Related U.S. Application Data

(60) Provisional application No. 61/621,309, filed on Apr. 6, 2012.

(51) Int. Cl.
*H01M 2/34* (2006.01)
*H01M 2/20* (2006.01)
*H01M 10/42* (2006.01)

(52) U.S. Cl.
CPC ............... *H01M 2/34* (2013.01); *H01M 2/202* (2013.01); *H01M 10/425* (2013.01); *H01M 10/4207* (2013.01); *H01M 2200/00* (2013.01)

(58) Field of Classification Search
None
See application file for complete search history.

(56) References Cited

U.S. PATENT DOCUMENTS

2006/0019155 A1*   1/2006   Seman et al. ............. 429/159

FOREIGN PATENT DOCUMENTS

| JP | 2003-109559 | * | 4/2003 |
| JP | 2003-109559 A | | 4/2003 |
| JP | 2005-166279 A | | 6/2005 |

* cited by examiner

*Primary Examiner* — Patrick Ryan
*Assistant Examiner* — Christopher Domone
(74) *Attorney, Agent, or Firm* — Knobbe Martens Olson & Bear LLP

(57) ABSTRACT

A rechargeable battery pack includes a plurality of unit cells, a protection circuit module, flexible printed circuit boards, and a case. The plurality of unit cells are comprised of a rechargeable battery and divided into a first group of unit cells and a second group of unit cells. The protection circuit module electrically protects the unit cells. The flexible printed circuit boards connect the unit cells to the protection circuit module. The case is equipped with the unit cells, the protection circuit module and the flexible printed circuit boards. The flexible printed circuit board forms a concave groove retracting corresponding to a positive electrode lead tab or a negative electrode lead tab in one of the first group of unit cells and the second group of unit cells, and include a bending part corresponding to the concave groove.

12 Claims, 7 Drawing Sheets

RECHARGEABLE BATTERY PACK

CROSS-REFERENCE TO RELATED APPLICATIONS

This application claims the benefit of U.S. Provisional Application No. 61/621,309, filed Apr. 6, 2012, which is hereby incorporated by reference in its entirety.

BACKGROUND OF THE INVENTION

1. Field of the Invention

The present invention relates to rechargeable battery packs having a flexible printed circuit board that defines a current path for transferring current to a protection circuit module from unit cells of the rechargeable battery.

2. Description of the Related Art

Rechargeable batteries may be repeatedly charged and discharged, unlike primary batteries. Low-capacity rechargeable batteries may be used for portable compact electronic apparatuses, for example, mobile phones, notebook computers, and/or camcorders. High-capacity rechargeable batteries may be used as a power source for, for example, driving a motor of an electric bike, a scooter, an electric vehicle, a fork lift and the like.

Rechargeable batteries can be used as a unit cell or a plurality of unit cells electrically connected depending on a type of employed apparatus. Rechargeable battery packs can comprise unit cells, a protection circuit module (PCM) for protecting the unit cells, a flexible printed circuit board (FPCB) for connecting the unit cells to the protection circuit module, and a case for accommodating these components.

The plurality of unit cells can be electrically connected in series or in parallel to make tablet-type rechargeable battery packs. For instance, three flexible printed circuit boards can be used in the rechargeable battery packs which connect six unit cells in parallel. A problem encountered in arrangement of the unit cells in the case is the difficulty in securing arrangement spaces of the flexible printed circuit boards connecting a negative electrode lead tab and a positive electrode lead tab to the protection circuit module. For this reason, there is a difficulty in securing a current path in the flexible printed circuit board.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a rechargeable battery pack having advantages of sufficiently securing a current path of a flexible printed circuit board for transferring current to a protection circuit module and an inner space for the unit cells of the rechargeable battery.

An exemplary embodiment of the present invention provides a rechargeable battery pack, including: a plurality of unit cells, a protection circuit module, flexible printed circuit boards, and a case. The plurality of unit cells are comprised of rechargeable batteries and are divided into a first group of unit cells and a second group of unit cells. The protection circuit module electrically protects the unit cells. The flexible printed circuit boards connect the unit cells to the protection circuit module. The case is equipped with the unit cells, the protection circuit module and the flexible printed circuit boards. The flexible printed circuit board forms a concave groove that retracts corresponding to a positive electrode lead tab or a negative electrode lead tab in one of the first group of unit cells and the second group of unit cells, and includes a bending part corresponding to the concave groove.

In another embodiment the aforementioned needs are addressed by a battery pack comprising, in one embodiment, a plurality of battery cells each having a first and a second electrode; at least one protection circuit module that is connected to the plurality of battery cells; and a case that accommodates the plurality of battery cells and the at least one protection circuit module. This embodiment also comprises a first flexible printed circuit board that is coupled to a first set of the first electrodes of the plurality of battery cells and the at least one protection circuit module and second flexible printed circuit board that is coupled to a first set of the second electrodes of the plurality of battery cells and the at least one of the protection circuit module wherein the second flexible printed circuit board is positioned adjacent at least some of the first set of first electrodes and wherein the second flexible printed circuit board defines a first planar surface and has a bending part formed adjacent at least some of the first set of first electrodes so as to extend outward from the first planar surface.

The second flexible printed circuit board may have concave grooves formed into the first planar surface adjacent the location of the at least some of the first set of first electrodes to which the first flexible printed circuit board is connected to.

The plurality of battery cells may be arranged in the case so as to comprise a first set of adjacent battery cells and a second set of battery cells.

The first electrodes of the battery pack and the second electrodes of the battery pack respectively comprise positive electrodes and negative electrodes.

The battery pack may further comprise a third printed circuit board that is coupled to a second set of the first or second electrodes of the plurality of battery cells and the at least one of the protection circuit module.

The first flexible printed circuit board may comprise a positive flexible printed circuit board that is connected to only positive electrodes of the first set of adjacent battery cells, the second flexible printed circuit board comprises a negative flexible printed circuit board that is connected to only negative electrodes of the second set of battery cells and the third flexible printed circuit board is connected to positive electrodes of the second set battery cells to which the negative flexible printed circuit board is connected to and negative electrodes of the first set of adjacent battery cells to which the positive flexible printed circuit board is connected to.

The first flexible printed circuit board may have curved parts formed adjacent the locations of the second set of second electrodes to which the third flexible printed circuit board is connected to.

At least some of the plurality of battery cells may be arranged so that the first and second electrodes are aligned in a first direction and the first flexible printed circuit board extends in the first direction that is aligned with the first electrodes and wherein the curved parts of the first printed circuit board extend around the second electrodes.

The third flexible printed circuit board may define a first planar surface and has concave grooves formed into the first planar surface adjacent the location of the at least some of the first set of first electrodes to which the first flexible printed circuit board is connected to.

The third flexible printed circuit board may define a bending part at locations adjacent the concave grooves.

The bending part may extend perpendicular to the first planar surface.

The case may define a first surface that has penetration holes that receives at least some of the first, second and third flexible printed circuit boards.

The case may define penetration holes that receive the curved parts of the first flexible printed circuit board.

The third flexible printed circuit board may define a penetration hole and the first surface of the case may define a fixing protrusion that engages with the penetration hole of the third flexible printed circuit board.

The first surface of the case may define one or more barrier parts that extend upwards to isolate the first and third flexible printed circuit boards.

The one or more barrier parts may extend into the concave grooves of the third flexible printed circuit board.

According to the exemplary embodiment of the present invention, there are advantages of sufficiently securing a current path connected to a protection circuit module in unit cells as well as an inner space of a slimmed case by including a bending part, which corresponds to a concave groove of a flexible printed circuit board.

DETAILED DESCRIPTION OF THE EMBODIMENTS

Figure 1:
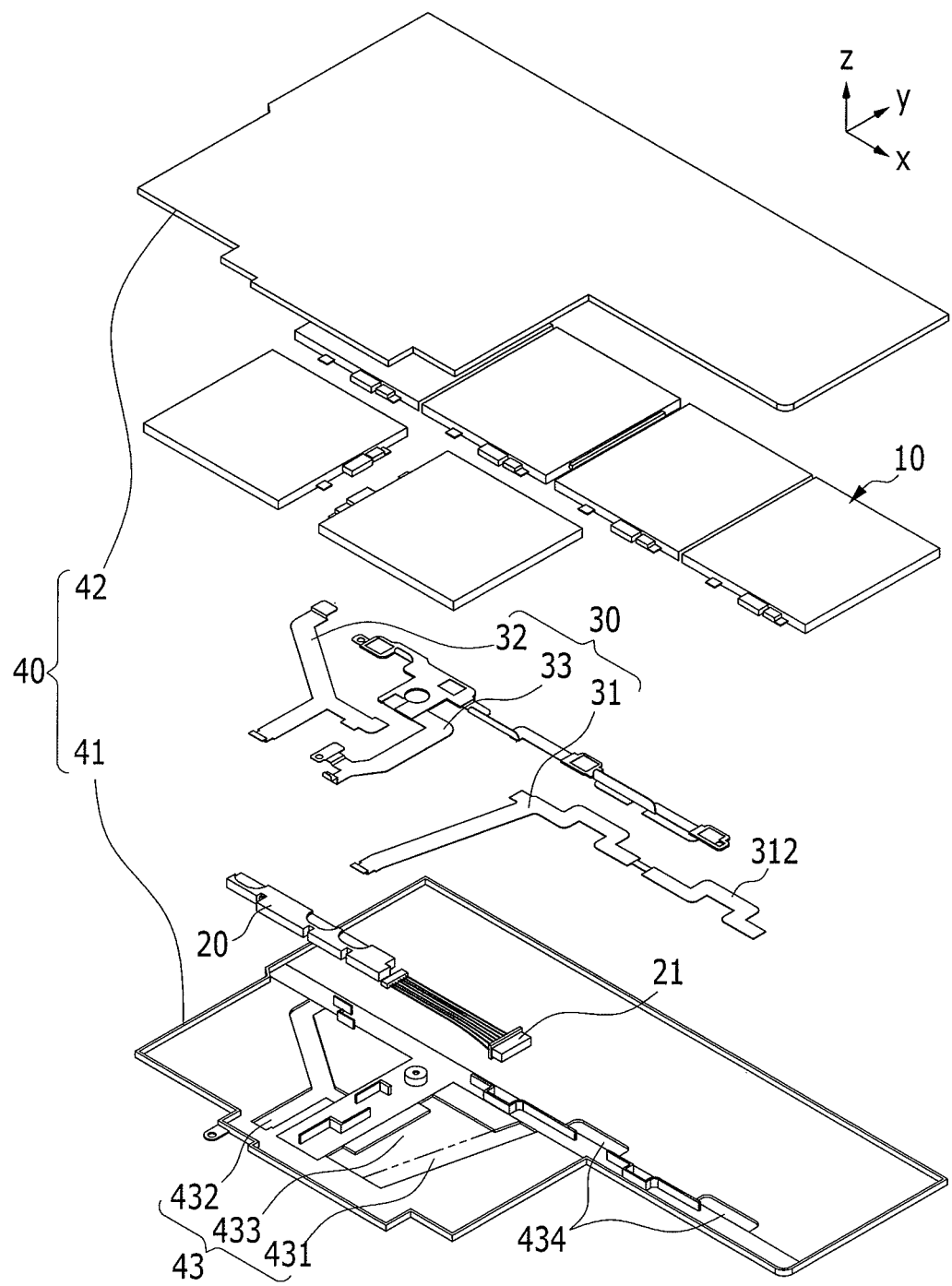
FIG. 1 is an exploded perspective view of a rechargeable battery pack according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
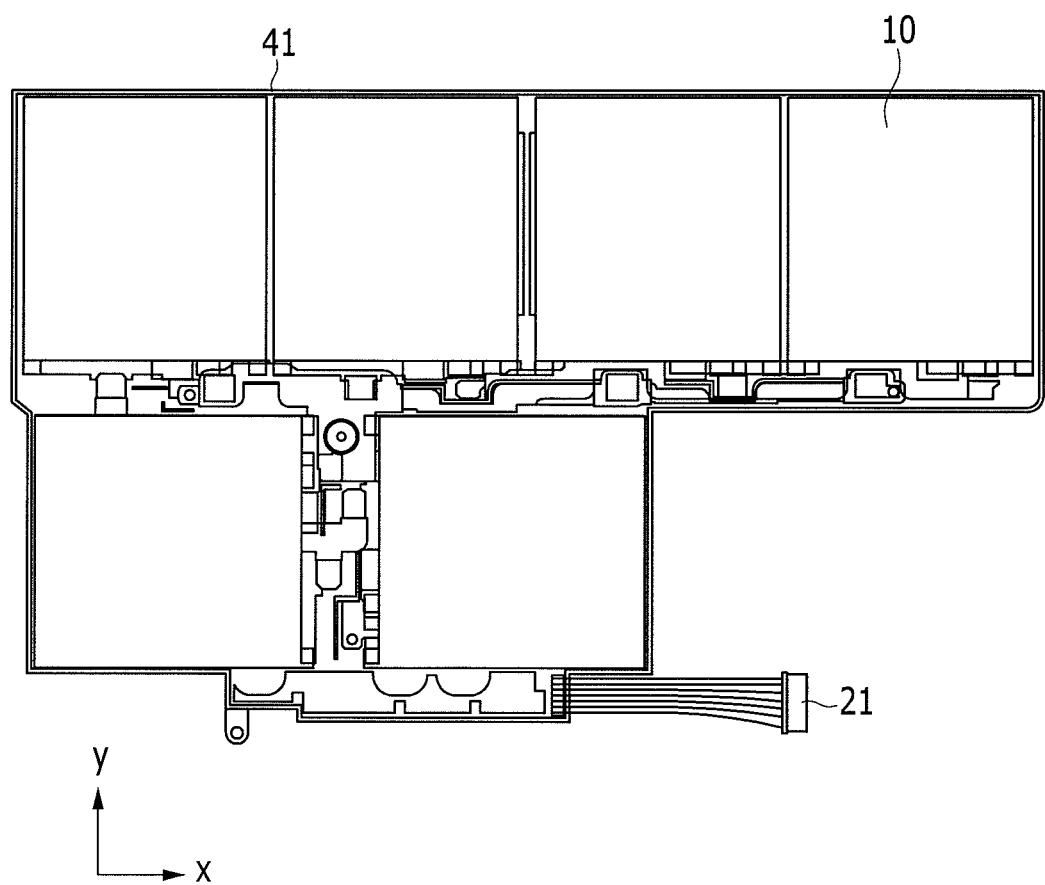
FIG. 2 is a top plan view with the exception of a top case in FIG. 1.

FIG. 1 is an exploded perspective view of a rechargeable battery pack according to an exemplary embodiment of the present invention, and FIG. 2 is a top plan view with the exception of a top case 42 in FIG. 1. Referring to FIGS. 1 and 2, the rechargeable battery pack according to an exemplary embodiment of the present invention includes a plurality of unit cells 10, a protection circuit module 20 electrically protecting the unit cells 10, flexible printed circuit boards 30 electrically connecting the unit cells 10 to the protection circuit module 20, and a case 40.

Figure 3:
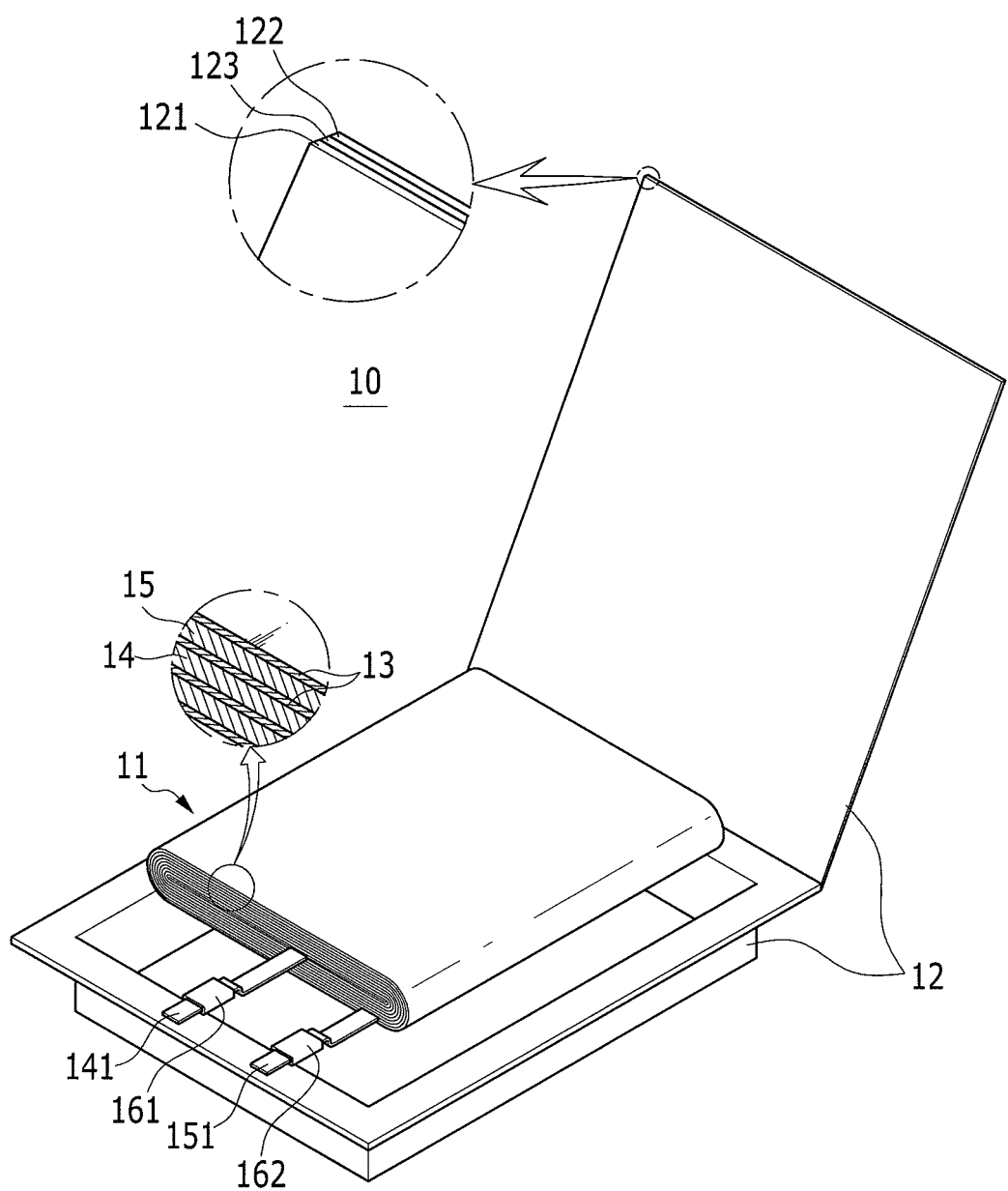
FIG. 3 is an exploded perspective view of a unit cell illustrated in FIG. 1.

FIG. 3 is an exploded perspective view of the unit cells 10 illustrated in FIG. 1. Referring to FIG. 3, the unit cells 10 are included in the rechargeable battery and includes an electrode assembly 11 which is charged and discharged, and a pouch 12 equipped with the electrode assembly 11.

In the electrode assembly 11, a positive electrode 14 and a negative electrode 15 are disposed with a separator 13 interposed therebetween. By winding them, the electrode assembly 11 has a jelly roll structure. The separator 13 may be made of a polymer film in which lithium ion can be passed.

The electrode assembly 11 may also be formed by stacking a negative electrode and a positive electrode, which are a single plate with the separator 13 interposed therebetween (not shown).

The positive electrode 14 includes a coated region for coating active materials on a collector of a metal thin film and an uncoated region in which the active material is not coated and set to an exposed collector. A positive electrode lead tab 141 is connected to the uncoated region of the positive electrode 14.

The negative electrode 15 includes a coated region for coating active materials of the positive electrode 14 and other active materials on a collector of the metal thin film and an uncoated region in which active material is not coated and set to an exposed collector. A negative electrode lead tab 151 is isolated from the positive electrode lead tab 141 to be connected to the uncoated region of the negative electrode 15.

One side of the pouch 12 has a concave structure to cover an exterior of the electrode assembly 11. The other side of the pouch 12 has a flat structure. Then, the pouch 12 accommodates the electrode assembly 11 by thermally bonding facing edges thereof.

The pouch 12 has a multi-layered sheet structure. For example, the pouch 12 includes a polymer sheet 121, a PET (polyethyleneneterephthalate) sheet, a nylon sheet or a PET-nylon composite sheet 122, and a metal sheet 123. The polymer sheet 121 is equivalent to an interior of the pouch 12 and performs an insulating function and thermal bonding. The PET sheet is equivalent to an exterior of the pouch 12 and performs a protecting function. The metal sheet 123 provides mechanical strength. As an example, the metal sheet 123 may be formed of an aluminum sheet.

The positive electrode lead tab 141 and the negative electrode lead tab 151 become withdrawn to the same side of the electrode assembly 11. Since the positive electrode lead tab 141 and the negative electrode lead tab 151 protrude to the outside of the thermally bonded pouch 12, the electrode assembly 11 is electrically connected outside the pouch 12. In this case, the positive electrode lead tab 141 and the negative electrode lead tab 151 are electrically insulated by each of insulating members 161 and 162.

Referring to FIGS. 1 and 2 again, the protection circuit module 20 is formed by mounting circuit elements on a printed circuit board in order to protect the unit cells 10 from over-charge, over-discharge, over-current, and external short.

In the case 40, the bottom case 41 and the top case 42 are coupled to mount the unit cells 10, the protection circuit module 20, and the flexible printed circuit board 30. For example, a hole is formed in the bottom case 41, and a locked protrusion is formed in the top case 42. By inserting the locked protrusion into the hole, the bottom case 41 and the top case 42 are combined (not shown).

The protection circuit module 20 includes a connector 21 to withdraw the connector 21 to the outside of the case 40, thereby providing power to a load of electronic apparatus.

Figure 4:
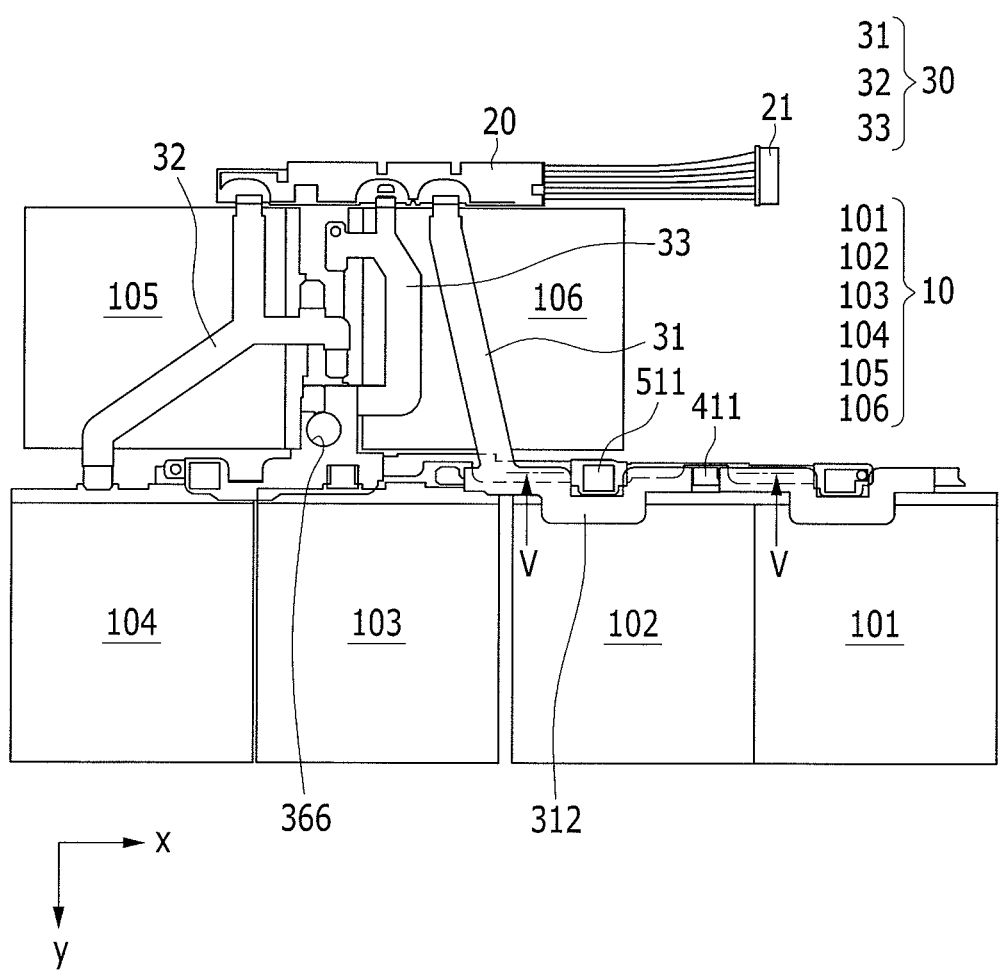
FIG. 4 is a bottom view with the exception of a case in FIG. 1.

FIG. 4 is a bottom view with the exception of a case in FIG. 1. Referring to FIG. 4, the flexible printed circuit boards 30 are comprised of three numbers such as a positive electrode flexible printed circuit board 31, a negative electrode flexible printed circuit board 32, and a blank flexible printed circuit board 33.

For instance, the positive electrode lead tabs 141 of a first group of the unit cells 101, 102, and 103 of positive electrode flexible printed circuit board 31 disposed on one side are connected to the protection circuit module 20. The second group of the unit cells 104, 105, and 106 of the negative electrode flexible printed circuit board 32 disposed on the other side are connected to the protection circuit module 20.

The negative electrode lead tabs 151 of the first group of the unit cells 101, 102, and 103 and the positive electrode lead tabs 141 of the second group of the unit cells 104, 105, and 106 of blank flexible printed circuit board 33 are connected to the protection circuit module 20. The blank flexible printed circuit board 33 additionally includes a current pattern for connecting the negative electrode lead tabs 151 and a current pattern for connecting the positive electrode lead tabs 141 (not shown), and then connects them to the protection circuit module 20, respectively.

Figure 5:
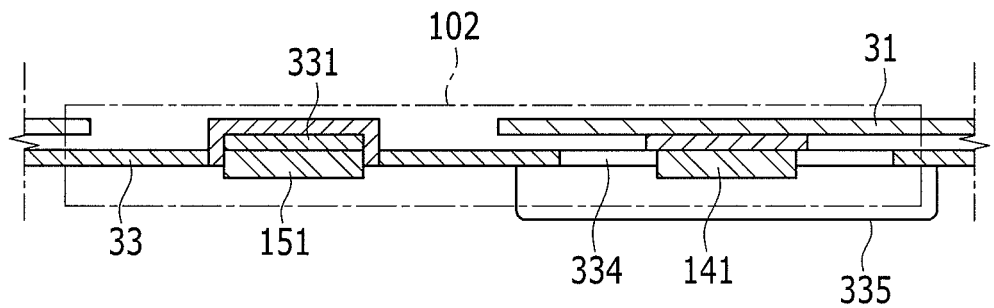
FIG. 5 is a cross-sectional view taken along line V-V in FIG. 4.

FIG. 5 is a cross-sectional view, taken along line V-V in FIG. 4. Referring to FIG. 5, the blank flexible printed circuit board 33 and the positive electrode flexible printed circuit board 31 have an overlapped region in a z-axis direction with respect to the positive electrode and negative electrode lead tabs 141 and 151 of the first group of the unit cells 101, 102, and 103.

That is, referring to FIG. 5, the blank flexible printed circuit board 33 is connected to a lower surface of the negative electrode lead tab 151 through a negative electrode negative electrode terminal 331. The positive electrode flexible printed circuit board 31 is connected to an upper surface of the positive electrode lead tab 141. To help understand the present invention, the unit cell 102 is illustrated as an imaginary line in FIG. 5.

Figure 6:
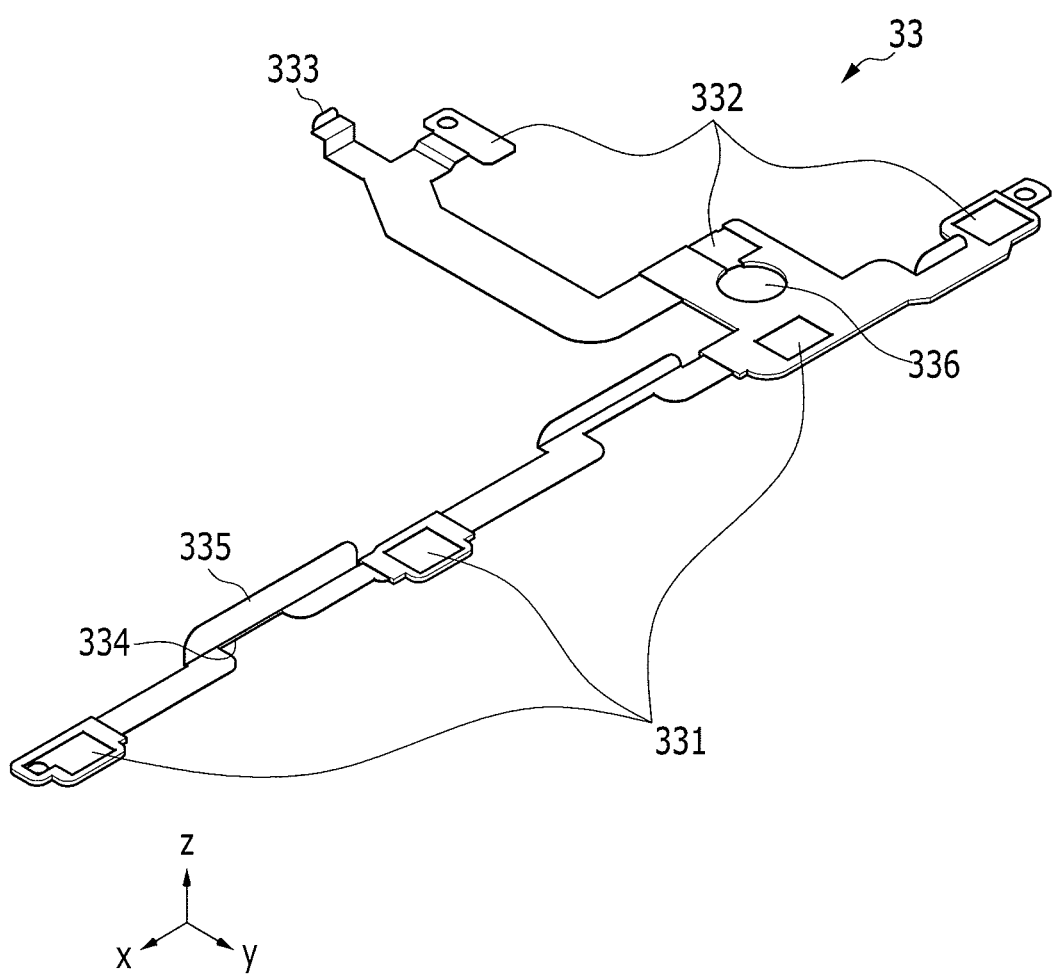
FIG. 6 is a perspective view of a blank flexible printed circuit board.
Figure 7:
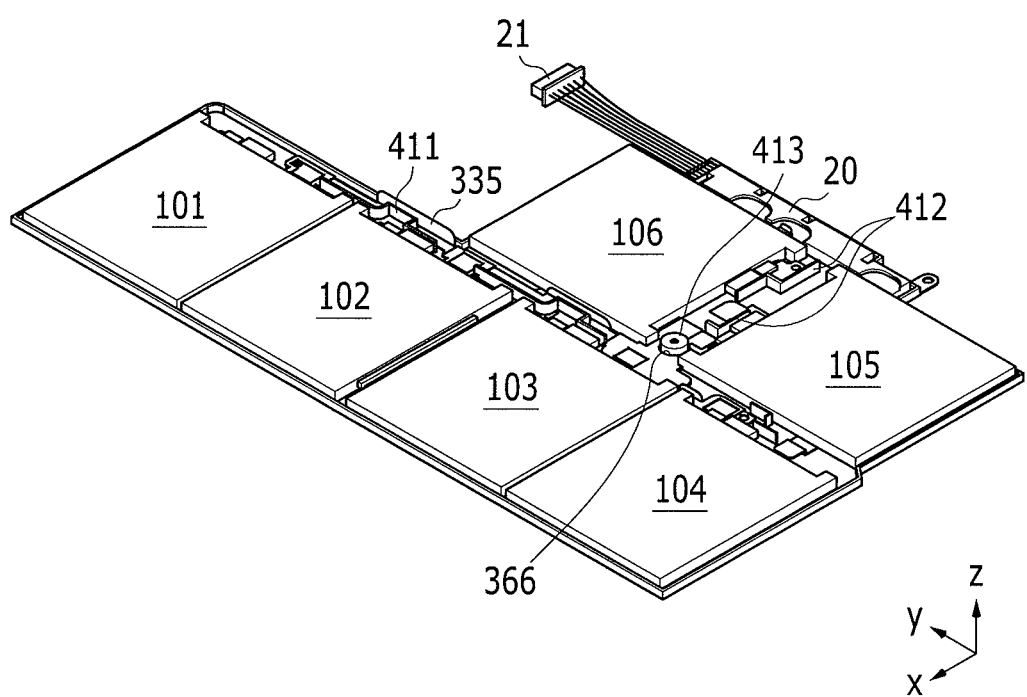
FIG. 7 is a perspective view showing the unit cell and the blank flexible printed circuit board, which are installed on a bottom case.

FIG. 6 is a perspective view of the blank flexible printed circuit board 33 and FIG. 7 is a perspective view showing the unit cell 10 and the blank flexible printed circuit board 33, which are installed on the bottom case 41.

Referring to FIGS. 6 and 7, the blank flexible printed circuit board 33 includes a negative electrode terminal 331 connected to negative electrode lead tabs 151 of the first group of unit cells 101, 102, and 103, a positive electrode terminal 332 connected to positive electrode lead tabs 141 of the second group of cells 104, 105, and 106, and a module terminal 333 connected to the protection circuit module 20.

Further, the blank flexible printed circuit board 33 includes a concave groove 334 that retracts corresponding to the positive electrode lead tab 141 of the first group of cells 102 and 103 and includes a bending part 335 corresponding to the concave groove 334.

The bending part 335 is bent perpendicular to a plane of the blank flexible printed circuit board 33, so that current path and pattern reduced by the concave groove 334 are additionally secured to prevent resistance increment due to the concave groove 334.

Further, the bending part 335 reinforces mechanical strength of the blank flexible printed circuit board 33 weakened on a circumference of the concave groove 334 and secures spaces in the case 40 while slimming the rechargeable battery pack.

The number of the concave grooves 334 and the bending part 335 in the blank flexible printed circuit board 33 may depend on the arrangement of the plurality of unit cells, and the division of the first and second groups of unit cells 10.

In addition, the positive electrode flexible printed circuit board 31 forms the curved part 312, which corresponds to the negative electrode lead tab 151 of the first group of unit cells 101 and 102 to be retracted. The curved part 312 is positioned on lower surfaces of the first group of unit cells 101 and 102 (see FIG. 4).

As shown in FIG. 7, the bottom case 41 protrudes upwards to isolate the positive electrode and negative electrode lead tabs 141 and 151 each other, so that cell barriers 411 and 412 electrically insulated are formed.

For example, the cell barrier 411 covers the positive electrode lead tabs 141 of the first group of unit cells 102 and 103 and is accommodated in the concave groove 334 of the blank flexible printed circuit board 33. In this case, the bending part 335 of the blank flexible printed circuit board 33 is disposed on an exterior of the cell barrier 411.

Accordingly, the blank flexible printed circuit board 31 is isolated from the positive electrode lead tab 141, and the positive electrode flexible printed circuit board 31 is isolated from the negative electrode lead tab 151 in a region where the blank flexible printed circuit board 33 is overlapped with the positive electrode flexible printed circuit board 31 in the z-axis direction.

Referring to FIG. 1, the bottom case 41 forms a penetration hole 43 corresponding to the flexible printed circuit board 30 in order to prevent interference with the flexible printed circuit board 30 that is disposed on a lower surface of the unit cell 10.

That is, the penetration hole 43 includes a first penetration hole 431, a second penetration hole 432, and a third penetration hole 433. The first penetration hole 431 corresponds to the positive electrode flexible printed circuit board 31 to be formed. The second penetration hole 432 corresponds to the negative electrode flexible printed circuit board 32 to be formed. The third penetration hole 433 corresponds to the blank flexible printed circuit board 33 to be formed. The first penetration hole 431 further forms a penetration hole 434 corresponding to the curved part 312 of the positive electrode flexible printed circuit board 31.

In the meanwhile, since the blank flexible printed circuit board 33 connects the first group of unit cells 101, 102, and 103 and the second group of unit cells 104, 105, and 106 to the protection circuit module 30. Also, the penetration hole 336 is formed in the center of the blank flexible printed circuit board (see FIGS. 4 and 6).

The bottom case 41 includes a fixed protrusion 413 corresponding to the penetration hole 336 of the blank flexible printed circuit board 33. The blank flexible printed circuit board 33 is combined with the fixed protrusion 413 by the penetration hole 336, so that its movement is suppressed with respect to x and y axis directions (see FIG. 7).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A battery pack comprising:
a plurality of battery cells each having a first and a second electrode;
at least one protection circuit module that is connected to the plurality of battery cells;
a case that accommodates the plurality of battery cells and the at least one protection circuit module;
a first flexible printed circuit board that is coupled to a first set of the first electrodes of the plurality of battery cells and the at least one protection circuit module;

a second flexible printed circuit board that is coupled to a first set of the second electrodes of the plurality of battery cells and the at least one of the protection circuit module wherein the second flexible printed circuit board is positioned adjacent at least some of the first set of first electrodes; and a third printed circuit board that is coupled to a second set of the first or second electrodes of the plurality of battery cells and the at least one of the protection circuit module wherein the third flexible printed circuit board defines a first planar surface and has a bending part formed adjacent at least some of the first set of electrodes so as to extend outward from the first planar surface;

wherein the first electrodes of the battery pack and the second electrodes of the battery pack respectively comprise positive electrodes and negative electrodes, wherein the first flexible printed circuit board comprises a positive flexible printed circuit board that is connected to only positive electrodes of the first set of adjacent battery cells, the second flexible printed circuit board comprises a negative flexible printed circuit board that is connected to only negative electrodes of the second set of battery cells and the third flexible printed circuit board is connected to positive electrodes of the second set of battery cells to which the negative flexible printed circuit board is connected to and negative electrodes of the first set of adjacent battery cells to which the positive flexible printed circuit board is connected to.

2. The battery pack of claim 1, wherein the third flexible printed circuit board has concave grooves formed into the first planar surface adjacent the location of the at least some of the first set of first electrodes to which the first flexible printed circuit board is connected to.

3. The battery pack of claim 1, wherein the plurality of battery cells are arranged in the case so as to comprise a first set of adjacent battery cells and a second set of battery cells.

4. The battery pack of claim 1, wherein the first flexible printed circuit board has curved parts formed adjacent the locations of the second set of second electrodes to which the third flexible printed circuit board is connected to.

5. The battery pack of claim 4, wherein at least some of the plurality of battery cells are arranged so that the first and second electrodes are aligned in a first direction and the first flexible printed circuit board extends in the first direction that is aligned with the first electrodes and wherein the curved parts of the first printed circuit board extend around the second electrodes.

6. The battery pack of claim 2, wherein the bending part at locations adjacent the concave grooves.

7. The battery pack of claim 6, wherein the bending part extends perpendicular to the first planar surface.

8. The battery pack of claim 1, wherein the case defines a first surface that has penetration holes that receives at least some of the first, second and third flexible printed circuit boards.

9. The battery pack of claim 8, wherein the case defines penetration holes that receive the curved parts of the first flexible printed circuit board.

10. The battery pack of claim 8, wherein the third flexible printed circuit board defines a penetration hole and wherein the first surface of the case defines a fixing protrusion that engages with the penetration hole of the third flexible printed circuit board.

11. The battery pack of claim 1, wherein the first planar surface of the case defines one or more barrier parts that extend upwards to isolate the first and third flexible printed circuit boards.

12. The battery pack of claim 11, wherein the one or more barrier parts extend into the concave grooves of the third flexible printed circuit board.

* * * * *